(12) United States Patent
Trobolowitsch (10) Patent No.: US 11,266,132 B2
(45) Date of Patent: Mar. 8, 2022

(54) LIGHT BAIT, AN IMPROVED LIGHT FIXTURE FOR GREATER WATER DEPTH

(71) Applicant: Friedrich Trobolowitsch, Kirchschlag (AT)

(72) Inventor: Friedrich Trobolowitsch, Kirchschlag (AT)

(*) Notice: Subject to any disclaimer, the term of this patent is extended or adjusted under 35 U.S.C. 154(b) by 14 days.

(21) Appl. No.: 17/045,755

(22) PCT Filed: Apr. 5, 2019

(86) PCT No.: PCT/EP2019/058676
§ 371 (c)(1),
(2) Date: Oct. 6, 2020

(87) PCT Pub. No.: WO2019/193168
PCT Pub. Date: Oct. 10, 2019

(65) Prior Publication Data
US 2021/0051933 A1  Feb. 25, 2021

Related U.S. Application Data

(63) Continuation-in-part of application No. 16/236,011, filed on Dec. 28, 2018, which is a
(Continued)

(30) Foreign Application Priority Data

Apr. 6, 2018 (EP) ..................................... 18166148

(51) Int. Cl.
*A01K 85/01* (2006.01)
*F21V 33/00* (2006.01)
(Continued)

(52) U.S. Cl.
CPC .............. *A01K 79/02* (2013.01); *A01K 85/01* (2013.01); *F21L 4/08* (2013.01); *F21V 3/0625* (2018.02);
(Continued)

(58) Field of Classification Search
CPC ........ A01K 79/02; A01K 85/01; A01K 69/06; A01K 75/02; F21L 4/08; F21V 3/0625;
(Continued)

(56) References Cited

U.S. PATENT DOCUMENTS 5,231,781 A  8/1993 Dunbar
6,203,170 B1  3/2001 Patrick et al.
(Continued)

FOREIGN PATENT DOCUMENTS

CN  205667257 U  11/2016
JP  S59105704 A  6/1984
(Continued)

OTHER PUBLICATIONS

ISA European Patent Office, International Search Report Issued in Application No. PCT/EP2019/058676, dated Jul. 2, 2019, WIPO, 6 pages.
(Continued)

*Primary Examiner* — Tracie Y Green
(74) *Attorney, Agent, or Firm* — McCoy Russell LLP (57) ABSTRACT

A lamp for use under water, comprising: an electrical lighting means, electrical connections for the power supply of the electrical lighting means, and a housing, wherein the housing is translucent at least in sections and defines a watertightly closable hollow space, wherein the electrical lighting means and the electrical connections are arranged within the hollow space, wherein the housing forms a mechanical shell surrounding the hollow space, the
(Continued)

mechanical shell having a double curvature at each point of the shell; and a use of the lamp as a light bait when fishing.

28 Claims, 8 Drawing Sheets

Related U.S. Application Data continuation-in-part of application No. 15/999,173, filed on Aug. 17, 2018, now abandoned, application No. 17/045,755, which is a continuation-in-part of application No. 15/999,173, filed on Aug. 17, 2018, now abandoned.

(51) Int. Cl.
*F21V 3/06* (2018.01)
*F21L 4/08* (2006.01)
*H05B 45/20* (2020.01)
*H05B 45/24* (2020.01)
*H05B 47/19* (2020.01)
*A01K 79/02* (2006.01)
*F21V 31/00* (2006.01)
*F21Y 115/10* (2016.01)

(52) U.S. Cl.
CPC ............ *F21V 31/00* (2013.01); *F21V 33/008* (2013.01); *H05B 45/20* (2020.01); *H05B 45/24* (2020.01); *H05B 47/19* (2020.01); *F21Y 2115/10* (2016.08)

(58) Field of Classification Search
CPC .......... F21V 31/00; F21V 33/008; F21V 3/02; F21V 33/00; H05B 45/20; H05B 45/24; H05B 47/19; F21Y 2115/10; F21Y 2113/10; F21S 10/00; F21S 9/02
See application file for complete search history.

(56) References Cited

U.S. PATENT DOCUMENTS

| 6,481,148 | B1* | 11/2002 | Lindgren | ............... | A01K 85/01 |
| | | | | | 362/158 |
| 6,993,866 | B1* | 2/2006 | Strange | ................. | A01K 85/01 |
| | | | | | 43/42.31 |
| 2014/0026465 | A1 | 1/2014 | Braun | | |
| 2015/0128474 | A1* | 5/2015 | James | ..................... | A01K 85/01 |
| | | | | | 43/17.6 |
| 2017/0122536 | A1 | 5/2017 | Noga | | |
| 2018/0092341 | A1* | 4/2018 | Martin | .................. | F21V 23/001 |
| 2019/0307110 | A1* | 10/2019 | Trobolowitsch | ....... | A01K 79/02 |

FOREIGN PATENT DOCUMENTS

| JP | S6179409 A | 4/1986 |
| JP | 2013247947 A | 12/2013 |
| KR | 20170076532 A | 7/2017 |

OTHER PUBLICATIONS

ISA European Patent Office, Written Opinion of the International Searching Authority Issued in Application No. PCT/EP2019/058676, dated Jul. 2, 2019, WIPO, 7 pages.

* cited by examiner

LIGHT BAIT, AN IMPROVED LIGHT FIXTURE FOR GREATER WATER DEPTH

FIELD OF THE PRESENT DISCLOSURE

The present disclosure concerns a lamp for use under water, in particular in the sea.

More specifically, the present disclosure concerns a lamp, which comprises the following: an electrical lighting means (e.g. an electrical lighting device), electrical connections for the power supply of the electrical lighting means, and a housing, wherein the housing is translucent at least in sections and defines a watertightly closable hollow space, wherein the electrical lighting means and the electrical connections are arranged within the hollow space. Furthermore, the present disclosure also refers to the use of such a lamp as a light bait when fishing.

BACKGROUND

It is known to use underwater lamps in order to increase the yield when fishing. The (at least one) electrical lighting means (or electrical light source) can, for example, comprise one or several LEDs. The electrical lighting means is optionally adapted to generate white light. The electrical connections can, for example, connect the electrical lighting means with a battery compartment and can, for example, belong to a printed circuit board on which the electrical lighting means is mounted.

JP 2013-247947 A shows a device with a watertight lighting body for baiting and fishing of cuttlefish or squid, for example. The lighting body comprises AAA batteries for the operation of several LEDs. When the batteries are empty, the housing has to be opened in order to be able to exchange the batteries. The housing has an elongated cylindrical section in which the batteries are accommodated. It consists of two housing parts which each comprise a cylindrical section having a screw thread (female thread or male thread) for connecting the two housing parts.

US 2017/0122536 A1 shows a watertight underwater lantern for an improved baiting and fishing of fish and shrimps. Here, power is supplied to the lighting means via a power supply line leading from the outside to the lantern. The housing consists of a cylindrical body having two end caps.

U.S. Pat. No. 6,203,170 B1 shows a device for attracting and/or repelling fish comprising an array of visible light emitting diodes encased in a water resistant, protective housing which is substantially transparent to the visible light emitted by the diodes. The device has a purge plug through which the interior of the housing may be communicated with the exterior, allowing the pressures inside and outside housing to be balanced.

Other types of underwater lamps are shown in JP S59 105704 U and JP S61 79409 U.

CN 205 667 257 U discloses a fish cage. U.S. Pat. No. 5,231,781 A shows a float for holding fishing nets. US 2014/026465 A1 describes a fishing lure with rechargeable batteries, a control circuit and light emitting diodes. KR 2017 0076532 A shows a buoy with a spherical housing and an LED for emitting light.

The known lamps are not suitable for use in great depths, as they would collapse under a correspondingly high water pressure.

It is an object of the present disclosure to provide a lamp which can be used and will work in greater depths than the known lamps.

SUMMARY OF THE PRESENT DISCLOSURE

The lamp of the present disclosure provides that the housing forms a mechanical shell surrounding a hollow space, the mechanical shell having a double curvature at each point of the shell. The mechanical shell surrounds the hollow space optionally to all sides, in particular in all directions, or completely. Here, a shell is understood to mean (according to engineering mechanics) a planar supporting structure or structural system which, in the present case, is doubly (spatially) curved and which can take loads perpendicularly as well as also in its plane. In the science of strength of materials, a shell is understood to also mean a body which is formed on the basis of a curved area and the thickness of which is small in comparison with its remaining dimensions. In the claimed shell, both principal curvatures are positive. Accordingly, the structural system has a double curvature. The shell can be a closed area. This means that in one wall of the housing a substantially closed area can be inscribed which corresponds to the shell. According to the present disclosure, said area (i.e. the shell) has a double curvature at each point of the area. The shell can also be a grid shell, wherein the grid shell has a double curvature. This means that then an imaginary area laid through the grid has a double curvature.

Optionally, the shell is formed by a part of the housing which substantially has the shape of an ellipsoid (more precisely of an ellipsoid area or of the surface of an ellipsoid). As an alternative, the shell can also be composed and constructed of contiguous ellipsoid segments or paraboloid segments. The ellipsoid can be triaxial; optionally, it is an ellipsoid of revolution or spheroid, in particular a sphere (see below). Furthermore, the ellipsoid can optionally be closed, i.e. all points of the area lie within one wall of the housing. Additional parts of the housing can be provided at an inner side or an outer side of the ellipsoid, for instance projections toward the outside for a retaining of the lamp, or a flange, and/or projections toward the inside for flat supports of parts integrated in the hollow space, or a groove for an annular ridge or for a sealing, or barrels or pin sleeves or threads for fastening integrated parts by means of screws.

It is particularly advantageous if the mechanical shell is substantially spherical. Here, at least a part of the housing substantially has the shape of a sphere. In this case there exist at least two, optionally three planes being perpendicular to one another, wherein in a section of the housing a (continuous) circle can be plotted with each of said planes. The spherical shape has the advantage that it has the smallest plane of section on all sides. Therefore, with this shape, under pressure there is generated the least thrust—in comparison with the surrounding volume—that the walls of the housing have to withstand. With regard to the dimensions of the spherical shape, the shell optionally has a diameter of at most 10 cm, for example less than 8 cm, further optionally less than 7 cm, for example less than 6 cm, optionally less than 5 cm.

According to a further example the Gaussian curvature of the mechanical shell at each point is at least $1\ m^{-2}$, furthermore optionally at least $10\ m^{-2}$, in particular at least $100\ m^{-2}$. In the case of a sphere, this produces a minimum radius of curvature in each of the normal planes in the direction of the principal curvatures of at most 100 mm. In case of other doubly curved shapes one principal curvature may have a larger radius, wherein, however, the respective other principal curvature must have a correspondingly smaller radius.

It is favorable if the mechanical shell is composed of two mechanical partial shells, wherein the mechanical partial shells are formed by connected housing parts. The partial shells can in particular be half shells. The partial shells each have a double curvature, respectively: they are e.g. constructed of elliptical areas, in particular of an ellipsoid segment, respectively, optionally of a hemisphere, respectively. An abutting surface between the partial shells is particularly elliptical, in particular circular, and forms a support. Starting from the abutting surface, both partial shells have a double curvature. The partial shells together surround the entire hollow space.

For the making of the connection, the two housing parts may each comprise a connecting flange, wherein the two connecting flanges are connected with one another. The connecting flanges are formed for instance as radially outwardly projecting annular surfaces, optionally integrally with the respective housing part. For example, the connecting flanges may have corresponding passages for mechanical connecting elements, in particular for screws. Passages for at least three connecting elements, in particular for four to eight connecting elements, can be provided. In this connection, in a contact surface of a connecting flange a circumferential recess (for instance a groove) for the accommodation of an annular ridge of a contact surface of the opposed connecting flange may be provided. By the reception of the annular ridge in the recess, thrusts between the partial shells may also be transferred diagonally to the contact surfaces.

Furthermore, at least one of the housing parts may comprise mechanical struts, wherein the mechanical struts start from at least one connecting flange and converge in a dome-shaped manner at a vertex of the respective housing part. The mechanical struts may in particular be supported against each other. Such struts serve as a part of the structural system of a reinforcement of the shell. The struts may also be understood as an additional grid shell. Thereby the statics and the structural stability of the housing may be reinforced without having to increase the wall thickness of the housing everywhere. This helps to save material and at the same time preserves the translucence of the sections with a smaller wall thickness between the struts (which are, so to speak, arcuate sections with a larger wall thickness).

As a material of the housing there can optionally be used a thermoplastic structural material, in particular on the basis of polycarbonate (PC) or on the basis of polymethylmethacrylate (PMMA). The materials "RIALON 110 00 ST UV1 natur" of the company RIA-Polymers GmbH, Germany, or "Lexan SLX2017T" of the company SABIC Innovative Plastics have proven to be particularly advantageous. It goes without saying that within the frame of the present disclosure also other materials with mechanical and optical properties (with regard to the translucence) comparable to those of the above-mentioned materials can be used advantageously. For example, the housing can be produced using an injection molding process.

The wall thickness of the housing or of the housing parts may be at least 2 mm, when the above-mentioned materials are used at least 4 mm, in particular between 3 mm and 8 mm, for example 6-7 mm in the region of struts and approximately 4.5 mm in the sections therebetween.

In one aspect, the electrical connections connect the electrical lighting means with an accumulator (i.e. rechargeable battery), wherein the accumulator is arranged within the hollow space. When the accumulator is used, a complex opening and closing of the housing for the exchange of batteries contained therein can be avoided. When the accumulator is empty, it can be charged from the outside, for instance via accessible contacts at an outside of the housing. The electrical lines for connecting the contacts with the accumulator in the hollow space can for instance be cast into the housing material during the production of the housing.

The accumulator may be connected with a receiver for a wireless energy transfer, wherein the receiver is arranged within the hollow space. The receiver comprises for instance a coupling coil for the inductive coupling with a transmitter which, in turn, is connected with a power supply. The arrangement is optionally adapted for the inductive charging of the accumulator. Here, the energy transfer is carried out without any cable through the wall of the housing. This has the advantage that electrical connections at the outside of the housing which, disadvantageously, would for instance be prone to rust, can be avoided.

Furthermore it has also proven to be advantageous that the electrical lighting means is connected with a light sensor, wherein the light sensor is arranged within the hollow space and is adapted to turn the lighting means off or to control the power consumption of the lighting means so that the electrical lighting means may be turned off or the power consumption can be decreased, if the light sensor detects a luminous flux above a predetermined threshold value. Through the control by means of a light sensor the lamp may be turned off when it is used at shallow depths or in case of the presence of the incidence of sunlight during the day in order to save power.

Furthermore it is favorable that the electrical lighting means is connected with a magnetic switch or a radio switch, wherein the magnetic switch or the radio switch is arranged within the hollow space and is adapted to receive a control signal via a magnetic field or via radio, wherein the magnetic switch or the radio switch is further adapted to turn the electrical lighting means on or off or to increase or decrease the power consumption of the lighting means in dependence on the control signal. It goes without saying that a radio switch can also be used in addition to a magnetic switch in order to support various possibilities of control. Both variants have the advantage that no electrical contacts have to be led outwardly in order to control the lamp. Thus, the power consumption of the lamp can be controlled without this control being detrimental to the water tightness of the housing.

According to an exemplary use of the present lamp, the lamp may be attached to a trap and can be submerged together with the trap. It has been shown that the use of a lamp in connection with such a trap (e.g. for a shrimp fishery) can increase the catch rate (by more than 70%), while the quantity of bait used remains unchanged.

The present disclosure also concerns a lamp for use under water, comprising: an electrical lighting means, electrical connections for the power supply of the electrical lighting means, and a housing, wherein the housing is translucent at least in sections, wherein the housing forms a mechanical shell surrounding the electrical lighting means and the electrical connections, said mechanical shell having a double curvature at each point of the shell. The mechanical shell formed by the housing may be substantially spherical.

Optionally, the electrical connections may connect the electrical lighting means with an accumulator, wherein the accumulator is arranged within the mechanical shell. According to a further embodiment, the accumulator may be connected with a receiver for a wireless energy transfer, wherein the receiver is arranged within the mechanical shell, thus enabling wireless charging of the accumulator.

The housing may comprise exterior housing parts and a filling, wherein the filling is arranged between the exterior housing parts and the electrical components inside the mechanical shell. The filling may comprise a thermoset (e.g. epoxy resin, phenolic resin, et cetera) or an elastomer (e.g. rubber).

According to a further aspect, the housing may be a single solid part enclosing inserts formed by the electrical components inside the mechanical shell. The housing may be produced by injection-mold around the inserts. In some aspects, the housing can be made of PC or PMMA for example.

In each of the above instances, the electrical lighting means may be an electrical multicolor light source. In this context, the lamp for use under water may comprise a controller with computer readable instructions that when executed cause the controller to control the light color emitted by the electrical multicolor light source.

The lamp may additionally comprise a digital camera and a storage medium for storing images and/or videos recorded by the digital camera. The digital camera may be configured for recording images and/or videos. The digital camera may be connected with the controller and operated in a pre-programmed fashion (e.g. at regular time intervals or after a predefined time after the lamp is switched on). The recorded images and/or videos may be stored on the storage medium for later readout. The readout may be performed via a wireless transceiver, wherein the wireless transceiver is connected with the storage medium and configured to transmit images and/or videos stored on the storage medium. For example, the images and/or videos may be transmitted to a smartphone, tablet, laptop or desktop computer. For example, the digital camera and the recorded images and/or videos may be used to observe and study the behavior of living catch (shrimps, lobsters or fish) in or outside a trap, in particular their eating habits.

In the following, preferred embodiments of the lamp and the use of the lamp according to the invention will be defined, as well as preferred combinations thereof:

1. A lamp for use under water, comprising:
    an electrical lighting means,
    electrical connections for power supply of the electrical lighting means, and
    a housing,
    wherein the housing is translucent at least in sections and defines a watertightly closable hollow space,
    wherein the electrical lighting means and the electrical connections are arranged within the hollow space, and
    wherein the housing forms a mechanical shell surrounding the hollow space, the mechanical shell having a double curvature at each point of the mechanical shell.
2. The lamp according to embodiment 1, wherein the mechanical shell is substantially spherical.
3. The lamp according to embodiment 1 or 2, wherein the Gaussian curvature of the mechanical shell at each point is at least 1 m$^{-2}$.
4. The lamp according to any one of the preceding embodiments, wherein the mechanical shell is composed of two mechanical partial shells (6a, 6b), wherein the mechanical partial shells (6a, 6b) are formed by connected housing parts.
5. The lamp according to embodiment 4, wherein the two housing parts each comprise a connecting flange, wherein the two connecting flanges are connected with one another.
6. The lamp according to embodiment 5, wherein in a contact surface of a connecting flange a circumferential recess for accommodation of an annular ridge of a contact surface of an opposed connecting flange is provided.
7. The lamp according to any one of embodiments 4 to 6, wherein at least one of the housing parts comprises mechanical struts, wherein the mechanical struts start from at least one connecting flange and converge in a dome-shaped manner at a vertex of the respective housing part.
8. The lamp according to any one of the preceding embodiments, wherein the electrical connections connect the electrical lighting means with an accumulator, wherein the accumulator is arranged within the hollow space.
9. The lamp according to embodiment 8, wherein the accumulator is connected with a receiver for a wireless energy transfer, wherein the receiver is arranged within the hollow space.
10. The lamp according to any one of the preceding embodiments, wherein the electrical lighting means is connected with a light sensor, wherein the light sensor is arranged within the hollow space and is adapted to turn the lighting means off or to control power consumption of the lighting means so that the electrical lighting means is turned off or the power consumption is decreased if the light sensor detects a luminous flux above a predetermined threshold value.
11. The lamp according to any one of the preceding embodiments, wherein the electrical lighting means is connected with a magnetic switch or a radio switch, wherein the magnetic switch or the radio switch is arranged within the hollow space and is adapted to receive a control signal via a magnetic field or via radio, wherein the magnetic switch or the radio switch is further adapted to turn the electrical lighting means on or off or to increase or decrease power consumption of the lighting means in dependence on the control signal.
12. A use of a lamp according to any one of embodiments 1 to 11 as a light bait when fishing.
13. The use according to embodiment 12, wherein the lamp is attached at a trap and is submerged together with the trap.
14. A lamp for use under water, comprising:
    an electrical lighting means,
    electrical connections for power supply of the electrical lighting means, and
    a housing,
    wherein the housing is translucent at least in sections,
    wherein the housing forms a mechanical shell surrounding the electrical lighting means and the electrical connections, the mechanical shell having a double curvature at each point of the mechanical shell.
15. The lamp according to embodiment 14, wherein the mechanical shell is substantially spherical.
16. The lamp according to embodiment 14 or 15, wherein the electrical connections connect the electrical lighting means with an accumulator, wherein the accumulator is arranged within the mechanical shell.
17. The lamp according to embodiment 16, wherein the accumulator is connected with a receiver for a wireless energy transfer, wherein the receiver is arranged within the mechanical shell.
18. The lamp according to embodiment 14, wherein the housing comprises exterior housing parts and a filling, wherein the filling is arranged between the exterior housing parts and the electrical components inside the mechanical shell.
19. The lamp according to embodiment 18, wherein the filling comprises a thermoset or an elastomer.

20. The lamp according to embodiment 14, wherein the housing is a single solid part enclosing inserts formed by the electrical components inside the mechanical shell.

21. A lamp for use under water, comprising:
an electrical multicolor light source,
electrical connections for power supply of the electrical multicolor light source,
a controller configured to control a light color emitted by the electrical multicolor light source and
a housing,
wherein the housing is translucent at least in sections and defines a water tight closable hollow space,
wherein the electrical multicolor light source and the electrical connections are arranged within the water tight closable hollow space, and
wherein the housing forms a mechanical shell surrounding the water tight closable hollow space, the mechanical shell having a double curvature at each point of the mechanical shell.

22. The lamp according to embodiment 21, wherein the electrical multicolor light source emits red and/or green and/or blue light.

23. The lamp according to embodiment 21, wherein the lamp comprises at least two electrical multicolor light sources, wherein the controller is configured to control the color emitted by each electrical multicolor light source independently.

24. The lamp according to embodiment 21, wherein the controller is configured to flash the electrical multicolor light source at a predetermined and/or configurable interval.

25. The lamp according to embodiment 21, wherein the electrical multicolor light source can emit light in the ultraviolet range.

26. The lamp according to embodiment 21, wherein the lamp further comprises a speaker.

27. The lamp according to embodiment 26, wherein the controller is configured to control the audio signal emitted by the speaker.

28. The lamp according to embodiment 27, wherein the controller is configured to control the speaker to play a sound file.

29. The lamp according to embodiment 27, wherein the sound volume and/or the sound duration is predetermined and/or configurable.

30. The lamp according to embodiment 21, wherein the lamp further comprises a wireless transceiver connected with the controller.

31. The lamp according to embodiment 30, wherein the controller is configured to receive settings of the light color and/or a luminosity and/or a flashing interval and/or a sound file via the wireless transceiver.

32. The lamp according to embodiment 30, wherein the wireless transceiver is a Bluetooth transceiver.

33. The lamp according to embodiment 21, wherein the lamp is used as a light bait when fishing.

34. The lamp according to embodiment 33, wherein the lamp is attached to a trap and is submerged together with the trap.

35. The lamp according to embodiment 21, wherein the lamp comprises a digital camera and a storage medium for storing images and/or videos recorded with the digital camera.

36. The lamp according to embodiment 35, wherein the wireless transceiver is connected with the storage medium and configured to transmit images and/or videos stored on the storage medium.

37. A lamp for use under water, comprising:
an electrical multicolor light source,
electrical connections for power supply of the electrical multicolor light source,
a controller configured to control the color emitted by the electrical multicolor light source, and
a housing,
wherein the housing is translucent at least in sections, and
wherein the housing forms a mechanical shell surrounding the electrical lighting device and the electrical connections, the mechanical shell having a double curvature at each point of the mechanical shell.

BRIEF DESCRIPTION OF THE DRAWINGS

In the following, the present disclosure will be explained in further detail by means of exemplary embodiments—to which it shall, however, not be limited—and by reference to the drawings.

DETAILED DESCRIPTION OF THE DRAWINGS

FIG. 1 to FIG. 3B show a lamp 1 for the use under water. The lamp 1 comprises a housing 2. The housing 2 consists of a first housing part 3 and a second housing part 4. In the shown embodiment, the housing 2 is formed by the connection of the two dome-shaped housing parts 3 and 4 substantially into a spherical shape. By the abutting surface 5, which is formed when the first housing part 3 and the second housing part 4 are connected with each other, there is formed a substantially spherical mechanical shell 6. Accordingly, the mechanical shell 6 has at each point of the shell 6 a double curvature, more precisely substantially the same curvature. In detail, in the represented example the mechanical shell 6 has at each point a Gaussian curvature of approximately 770 m$^{-2}$ (which corresponds to a diameter of the sphere of approximately 72 mm). Here, the first housing part 3 and the second housing part 4 each form a mechanical partial shell 6a, 6b of which the mechanical shell 6 is composed. In a connected state of use of the housing parts 3, 4, the mechanical shell 6 encloses a hollow space 7 in the housing 2. In this connection, the hollow space 7 is defined by the housing 2 and may be closed in a watertight manner by the connection of the housing parts 3, 4.

For the connection of the housing parts 3 and 4 with each other and for the disengagement of the housing parts 3 and 4, the first housing part 3 comprises a first connecting flange 8 and the second housing part 4 comprises a second connecting flange 9. In the operating state of the lamp, the two connecting flanges 8, 9 are connected with each other. Starting from the connecting flanges 8, 9, circumferential struts 10 extend respectively along the dome-shaped contour of the housing parts 3, 4 substantially in the direction of a first vertex S1 and a second vertex S2, respectively, at which the circumferential struts 10 converge. By the circumferential arrangement of the struts 10 there are formed sections 11 which are more translucent than the struts 10. The housing 2 may be made of a translucent polycarbonate, wherein the translucence in the region of the struts 10 is lower than in the sections 11 therebetween.

Figure 3A:
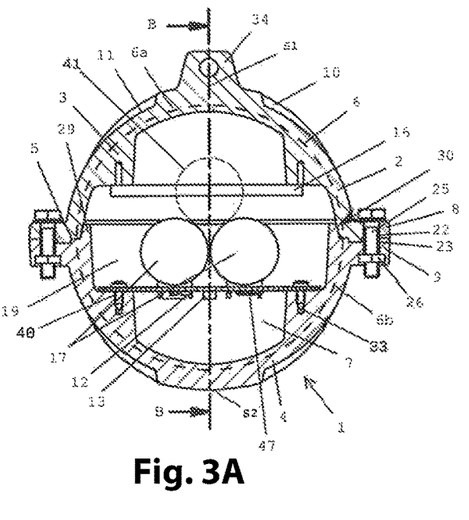
FIG. 3A shows a sectional side view of the lamp according to FIG. 1 along the section axis III-III in FIG. 2.
Figure 3B:
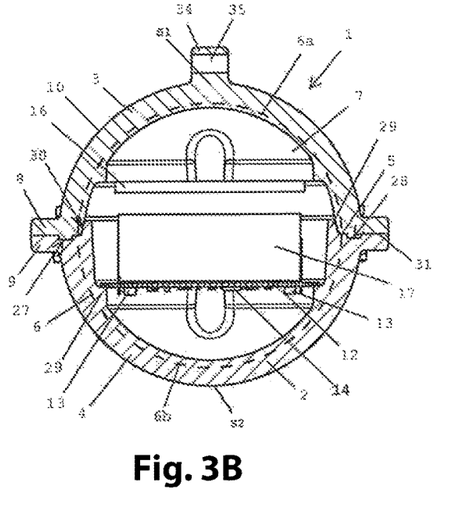
FIG. 3B shows a sectional side view of the lamp according to FIG. 1 along the section axis B-B in FIG. 3A.

Within the hollow space 7 in the area of the second housing part 4 there may be a printed circuit board 12 comprising two electrical lighting means 13 (LEDs; as an alternative there can for instance also be used just one LED which is positioned in the middle; each light source may comprise one or more light emitters, such as LEDs; the electrical lighting means may comprise multicolor light sources) and a controller 47 mounted thereon, a schematically represented light sensor 14 and a schematically represented magnetic switch 15. The controller 47 may be configured with computer readable instructions that when executed cause the controller to control the light color emitted by each of electrical multicolor light sources independently. The multicolor light sources may be controlled to emit red and/or green and/or blue light and/or light in the ultraviolet range, i.e. having a wavelength below 400 nanometers. The controller may further be configured to flash the electrical multicolor light source at a predetermined and/or configurable interval. The light sensor 14 is adapted to turn the lighting means 13 off so that the electrical lighting means 13 may be turned off when the light sensor 14 detects a luminous flux above a predetermined threshold value (e.g. incident sunlight at a shallow depth in the water during the day, approximately at 0-15 m below the water level). The light sensor 14 may be supplied with power from an additional accumulator 41 (plotted in dotted lines). Here, the additional accumulator 41 is only adapted to supply power to the light sensor 14 and not to the lighting means 13. Like the accumulators 17, the additional accumulator 41 may be charged inductively via the receiver 16.

The magnetic switch 15 may be adapted to receive a control signal via a magnetic field (e.g. by means of a Hall sensor), and it may turn on or turn off the electrical lighting means 13 in dependence on a control signal (e.g. direction of an approximated strong magnetic field). Within the hollow space 7 there is arranged a receiver 16 in the region of the first housing part 3 for the wireless charging of accumulators 17. In the hollow space section 19 formed between the printed circuit board 12 and the receiver 16 there are arranged accumulators 17. The accumulators 17 may each be electrically connected to the printed circuit board 12, wherein the printed circuit board 12 has electrical connections which connect the accumulators 17 to the electrical lighting means 13 for the power supply.

Figure 4:
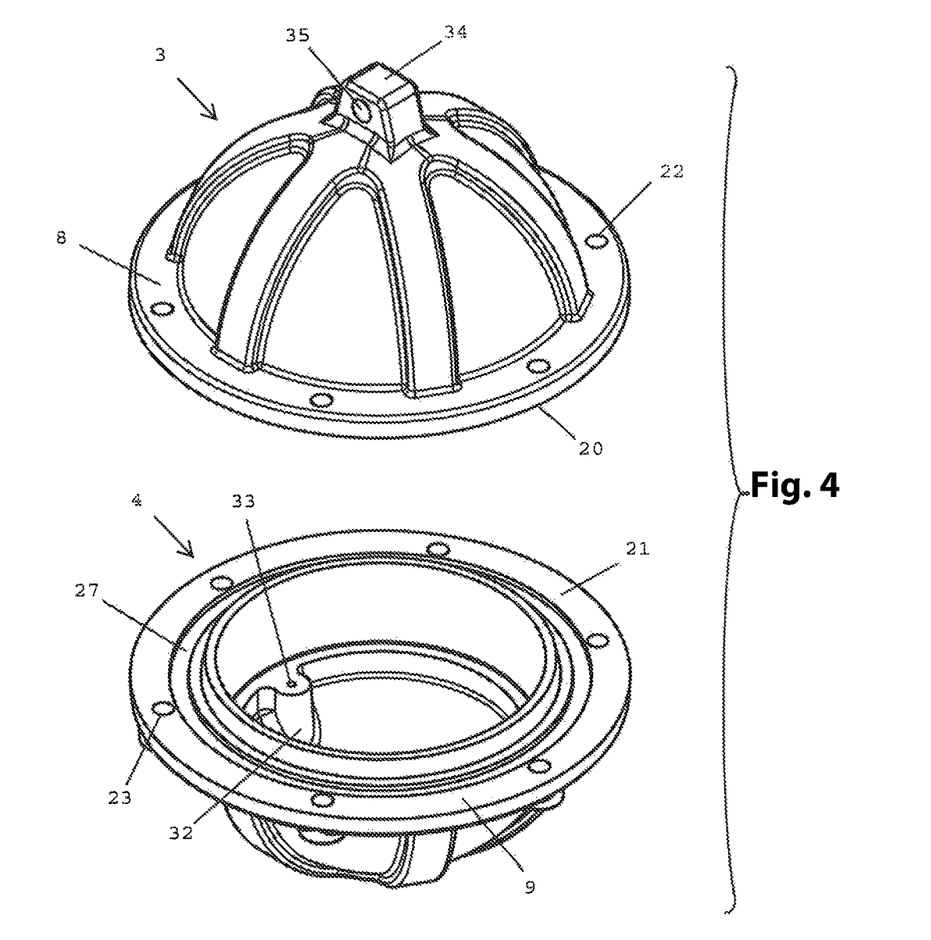
FIG. 4 shows an exploded view of the housing of the lamp as shown in FIG. 1, with first and second housing parts being disengaged from one another.

FIG. 4 shows the first housing part 3 and the second housing part 4 of the housing 2 of the lamp 1 in a state disengaged from one another. The connecting flanges 8 and 9 have a first contact surface 20 and a second contact surface 21, respectively, with the same amount of first passage 22 or second passage 23 arranged circumferentially at regular intervals for receiving mechanical connecting elements 24, e.g. screws 25 and nuts 26 (see FIG. 3A). The nuts 26 are each received and non-rotatably held in a sunk arrangement in sleeves formed at the second connecting flange 9. In the shown example, the connecting elements 24 comprise six screws 25, each with a washer and a nut 26. In some aspects, the screws may be V4A (stainless steel screws), and the screws 25 may have the nominal diameter M4. The first passage 22 and the second passage 23 are arranged such that they align with each other when the first housing part 3 is connected with the second housing part 4. Furthermore, in the second contact surface 21 there may be arranged a circumferential recess 27 for accommodating a projecting annular ridge 28 (see FIG. 3B) at the first contact surface 20. As shown in FIG. 3B, the second housing part 4 has a conical guiding section 29 which engages in a corresponding receiving section 30 of the first housing part 3 when the two first housing part 3 and the second housing part 4 are connected, and which will be accommodated with a press-fit when the screws 25 are tightened. In addition, an adhesion surface area 31 is provided between the contact surfaces 20, 21 for connecting the first housing part 3 and the second housing part 4.

For the mounting of the printed circuit board 12, in the second housing part 4 there may be provided supporting webs 32 with tap holes 33 arranged therein. The printed circuit board 12 may be attached at the supporting webs 32 by means of sheet metal screws 40 (see FIG. 3A) made of V4A which may be tightened or screwed down in the tap holes 33. Above the vertex S1 of the first housing part 3 there may be a fastening spigot 34 with a through hole 35 for leading through a rope for the mounting of a submergible trap (not shown).

Figure 5A:
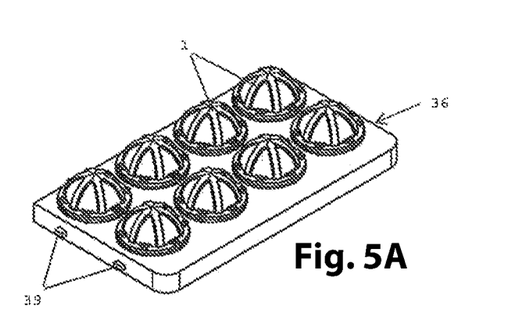
FIG. 5A shows a diagrammatic view of a charging station for the wireless charging of an accumulator integrated in the eight accommodated lamps according to FIGS. 1-3.
Figure 5B:
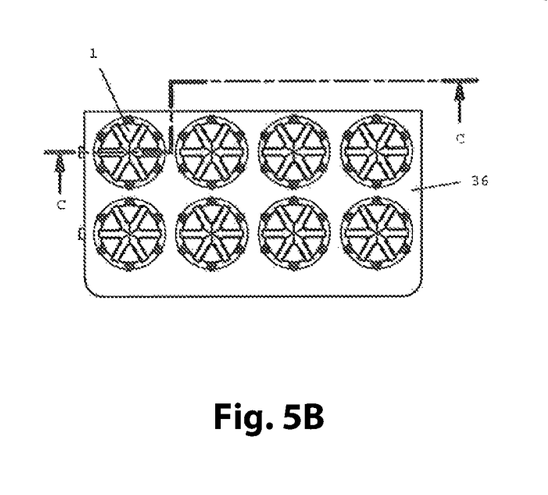
FIG. 5B shows a plan view of the charging station according to FIG. 5A.
Figure 5C:
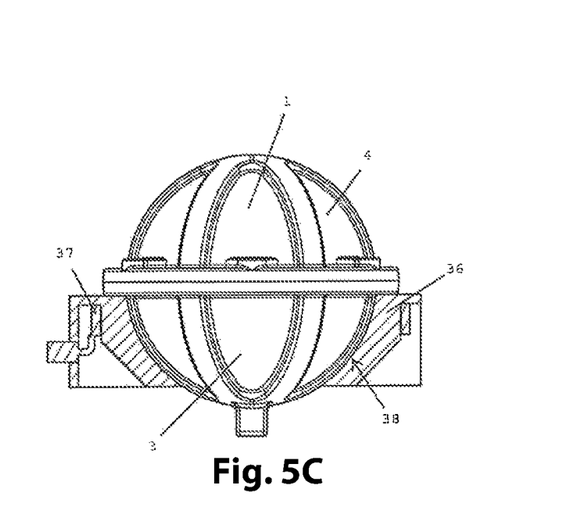
FIG. 5C shows a partial section according to the section axis C-C in FIG. 5C.

FIGS. 5A to 5C show an arrangement of the lamp 1 in a charging station 36 for the wireless energy transfer between the receiver 16 (see FIG. 3A) and an inductive coil 37 arranged in the charging station 36. In the charging state, the connecting flange 8 of the first housing part 3 rests substantially flat on one side of the charging station 36, whereby the receiver 16 (e.g. a coil) of the first housing part 3 and the inductive coil 37 of the charging station 36 substantially lie within a horizontal plane. A receiving opening 38 is formed in the charging station 36 such that it corresponds to the dome-shaped outer contour of the second housing part 3 received therein. The charging station 36 further comprises two charging sockets 39 for the voltage supply of the inductive coils 37. In the example, the charging sockets 39 are connectors for a USB charging device. When a voltage supply is connected, the accumulators 17 arranged in the hollow space section 19 are charged through the receiver 16 via the inductive coil 37.

As shown in FIG. 5A, several lamps 1 can be arranged in a charging station 36 and may be charged respectively via an inductive coil 37. On the whole, in the shown example the charging station 36 has eight receiving openings 38 and corresponding coils 37 in order to be able to charge eight lamps 1 simultaneously.

Figure 6A:
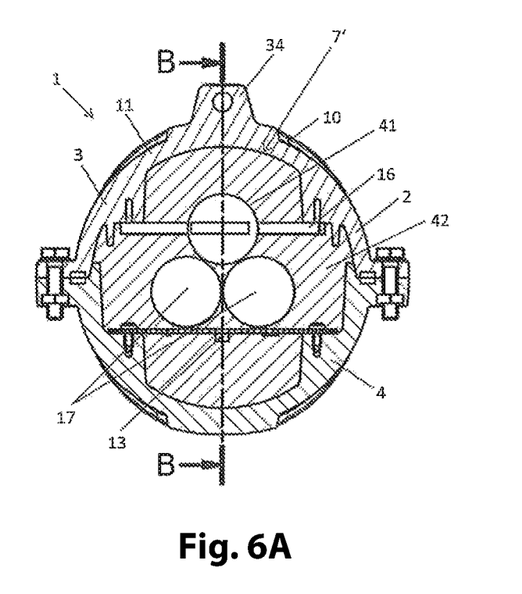
FIG. 6A shows a sectional side view of a second embodiment of a lamp having a filled housing and FIG. 6B shows a sectional side view of the lamp according to FIG. 6A along the section axis B-B in FIG. 6A.
Figure 6B:
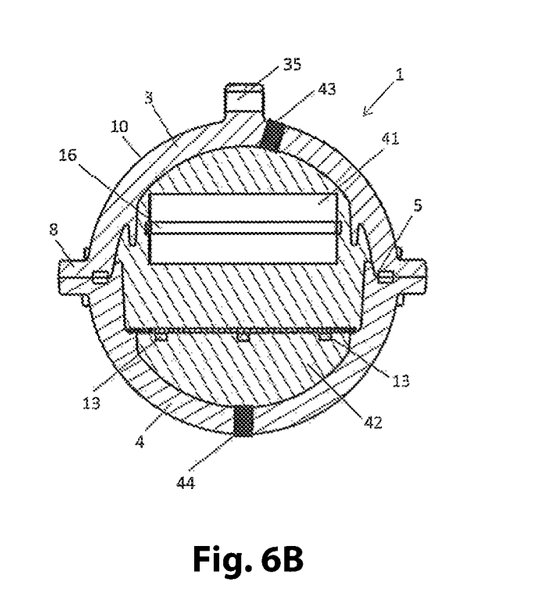

The lamp 1 according to the second embodiment shown in FIGS. 6A and 6B is similar to the first embodiment according to FIGS. 3A and 3B, with at least two exceptions: the light sensor 14 (shown in FIG. 3B) is supplied with power from the additional accumulator 41. FIG. 6B shows a schematic sectional view of the additional accumulator 41. Moreover, the housing formed by the two exterior housing parts 3, 4 does not define a hollow space, but its interior 7' is filled with a solid filling 42. The solid filling 42 is arranged between the exterior housing parts 3, 4 and the electrical components inside the mechanical shell. The material of the filling 42 may be a thermoset (e.g. epoxy resin, phenolic resin, et cetera) or an elastomer (e.g. rubber). The material of the housing 2 may be polycarbonate or polymethyl-methacrylate. FIG. 6B identifies two points 43, 44 that may be used as injection points temporarily created in the housing for filling the housing with the filling material or as vacuum suction points for sucking-in a filling material (e.g. resin) in a liquid or viscous phase. To avoid repetition, similar elements are indicated by the same reference signs as used in the first embodiment shown in FIGS. 3A and 3B and it is referred to the above description with respect to those elements.

Figure 7A:
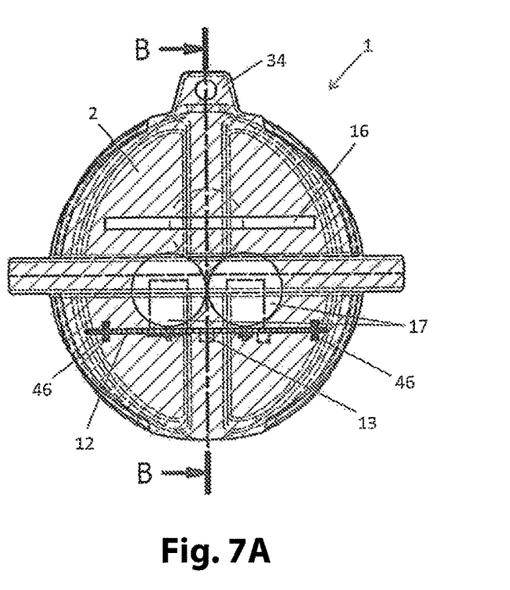
FIG. 7A shows a sectional side view of a third embodiment of a lamp having a solid housing.
Figure 7B:
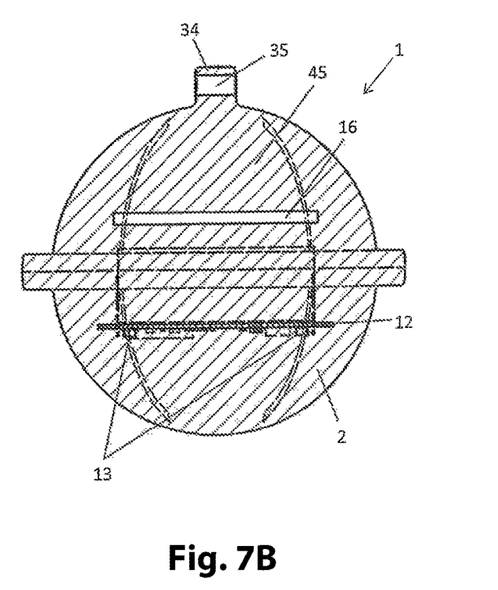
FIG. 7B shows a sectional side view of the lamp according to FIG. 7A along the section axis B-B in FIG. 7A.

The lamp according to the third embodiment shown in FIGS. 7A and 7B again shares multiple elements with the previous embodiments, which therefore are indicated by the same reference signs and will not be explained again in this instance to avoid unnecessary redundancy. The housing 45 in this embodiment may be a single solid part made of polycarbonate (PC) or polymethyl-methacrylate (PMMA), which encloses inserts formed by the electrical components of the lamp 1. The housing may be injection-molded around the inserts. The inserts comprise the printed circuit board 12 comprising two electrical lighting means 13, for example LEDs or generally multicolor light sources, mounted thereon. The lighting means 13 via the printed circuit board 12 are connected to the accumulators 17, which themselves may be connected to the receiver 16 for charging. The housing 45 may be produced by supporting at least the above-mentioned inserts on guide pins 46 inside an injection mold defining the outer shape and contour of the lamp 1 and filling the injection mold with the housing material. The inserts are therefore fully embedded and fixed in the housing material. The outer shape of the housing may correspond to that of the first and second embodiments; however, the housing 45 is not hollow and the enclosed space is defined by the boundaries of the inserts.

Figure 8:
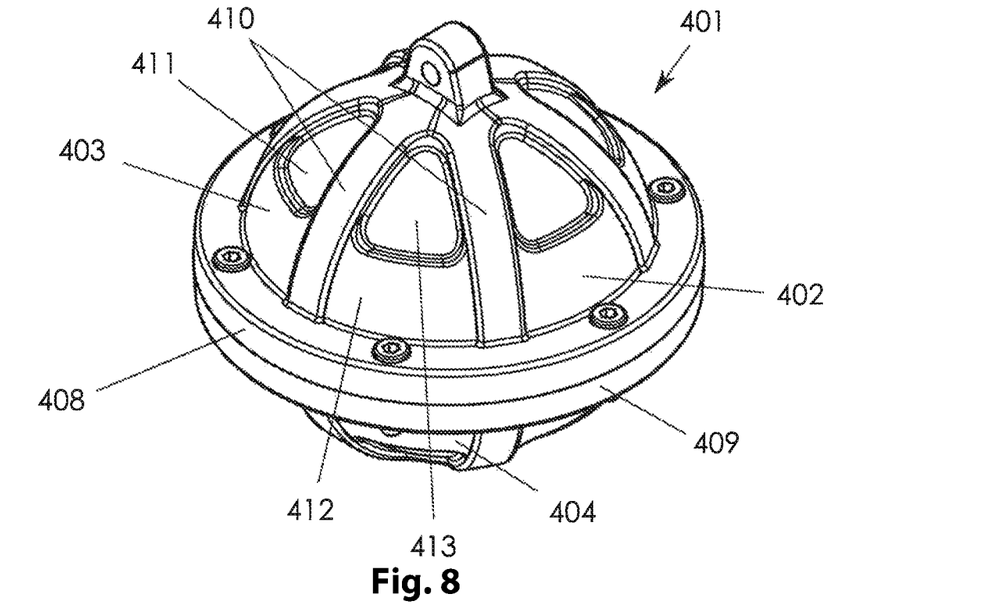
FIG. 8 shows a diagrammatic view of a forth embodiment of a lamp according to the present disclosure.
Figure 9:
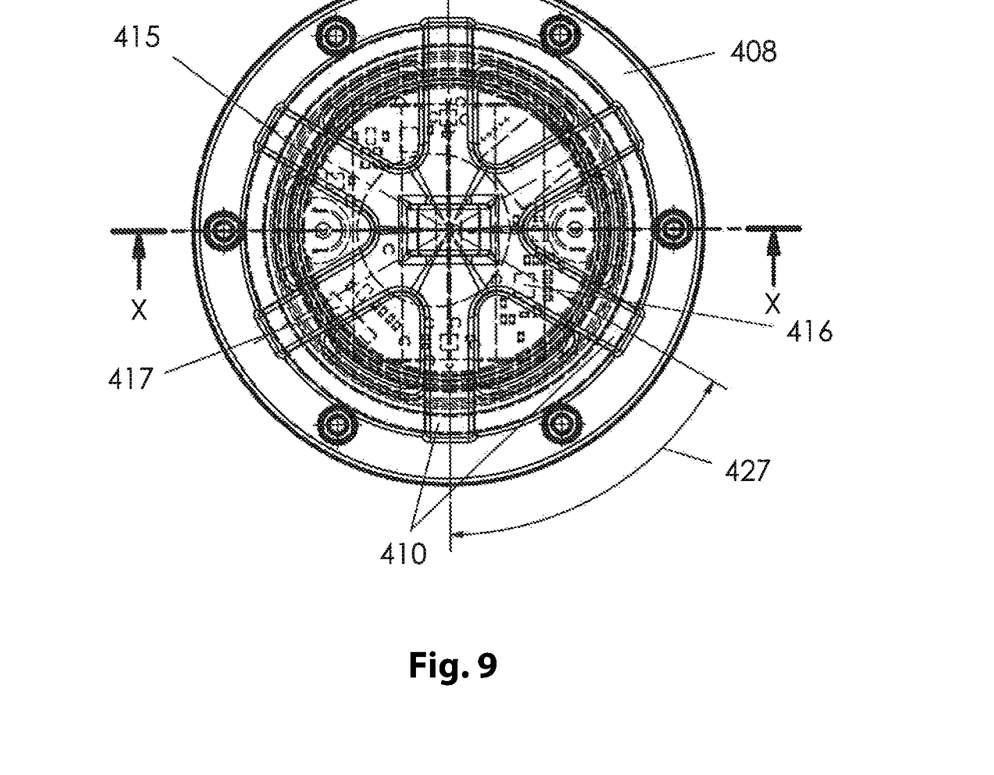
FIG. 9 shows a plan view of the lamp according to FIG. 8.
Figure 10A:
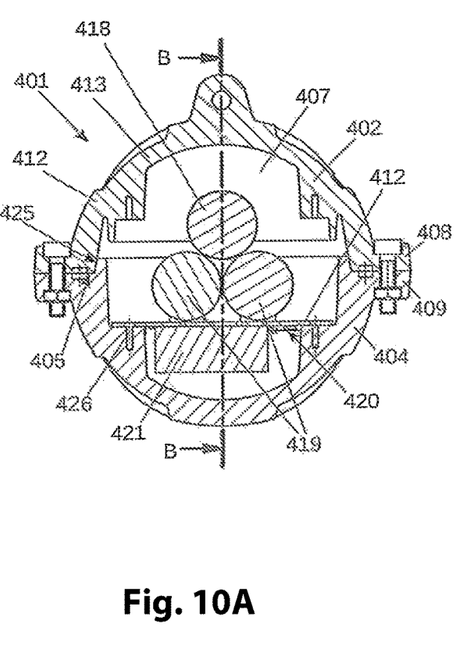
FIG. 10A shows a sectional side view of the lamp according to FIG. 8 along the section axis X-X in FIG. 9.
Figure 10B:
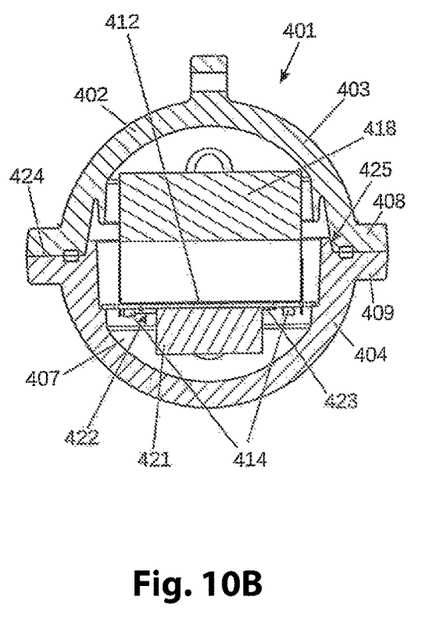
FIG. 10B shows a sectional side view of the lamp according to FIG. 8 along the section axis B-B in FIG. 10A.

FIGS. 8 to 10 show a lamp 401 for use under water according to a fourth embodiment. The lamp 401 comprises a housing 402. The housing 402 consists of a first housing part 403 and a second housing part 404. In the shown embodiment, the housing 402 is formed by the connection of the two dome-shaped housing parts 403 and 404 substantially into a spherical shape. By the abutting surface 405, which is formed when the first housing part 403 and the second housing part 404 are connected with each other, there is formed a substantially spherical mechanical shell. Accordingly, the mechanical shell may have at each point of the shell a double curvature, more precisely substantially the same curvature. The first housing part 403 and the second housing part 404 each form a mechanical partial shell of which the mechanical shell is composed. In a connected state of use of the housing parts 403, 404, the mechanical shell encloses a hollow space 407 in the housing 402. In this connection, the hollow space 407 may be defined by the housing 402 and can be closed in a watertight manner by the connection of the housing parts 403, 404.

For the connection of the housing parts 403 and 404 with each other and for the disengagement of the housing parts 403 and 404, the first housing part 403 comprises a first connecting flange 408 and the second housing part 404 comprises a second connecting flange 409. In the operating state of the lamp 401, the two connecting flanges 408, 409 are connected with each other. The connecting flanges 408, 409 may be adhered to each other via a glued surface 424. The horizontal arrangement of the connecting flanges 408, 409 can be fixed with a press fit 425. Starting from the connecting flanges 408, 409, circumferential struts 410 extend respectively along the dome-shaped contour of the housing parts 403, 404 substantially in the direction of a first (top) vertex and a second (bottom) vertex, respectively, at which the struts 410 converge. By the circumferential arrangement of the struts 410 there may be formed sections 411 between the struts 410. The angle 427 enclosed by neighboring struts 410 may be 60°. The sections 411 are subdivided into an essentially rectangular support subsection 412 adjacent to the flange 408, 409 and an essentially triangular translucent subsection 413 adjacent to the vertices. The housing 402 may be made of a translucent polycarbonate, wherein the translucence in the region of the struts 410 and the support subsections 412 is lower than in the translucent subsections 413.

Within the hollow space 407 in the area of the second housing part 404 there may be provided a printed circuit board 412 comprising two electrical multicolor light sources 414 (e.g. LEDs; as an alternative there can for instance also be used just one LED which is positioned in the middle; each light source may comprise one or more light emitters, such as LEDs) and a controller 415 mounted thereon, a schematically represented light sensor 416 and a schematically represented magnetic switch 417. The printed circuit board 412 may be fixed to the second housing part 404 with stainless steel screws 426. The controller 415 may be configured to control the light color emitted by each of the electrical multicolor light sources 414 independently. The multicolor light sources 414 may be controlled to emit red and/or green and/or blue light and/or light in the ultraviolet range, i.e. having a wavelength below 400 nanometers. The controller 415 is further configured to flash the electrical multicolor light sources 414 at a predetermined and/or configurable interval. The multicolor light sources 414 comprise an ultraviolet light source 423.

The light sensor 416 may be adapted to turn the multicolor light source 414 off so that the electrical multicolor light source 414 can be turned off when the light sensor 416 detects a luminous flux above a predetermined threshold value (e.g. incident sunlight at a shallow depth in the water during the day, approximately at 0-15 m below the water level). The light sensor 416 may be supplied with power from an additional accumulator 418. The additional accumulator 418 is only adapted to supply power to the light sensor 416 and not to the multicolor light source 414. Like the accumulators 419, the additional accumulator 418 may be charged inductively via a wireless power receiver.

Figure 1:
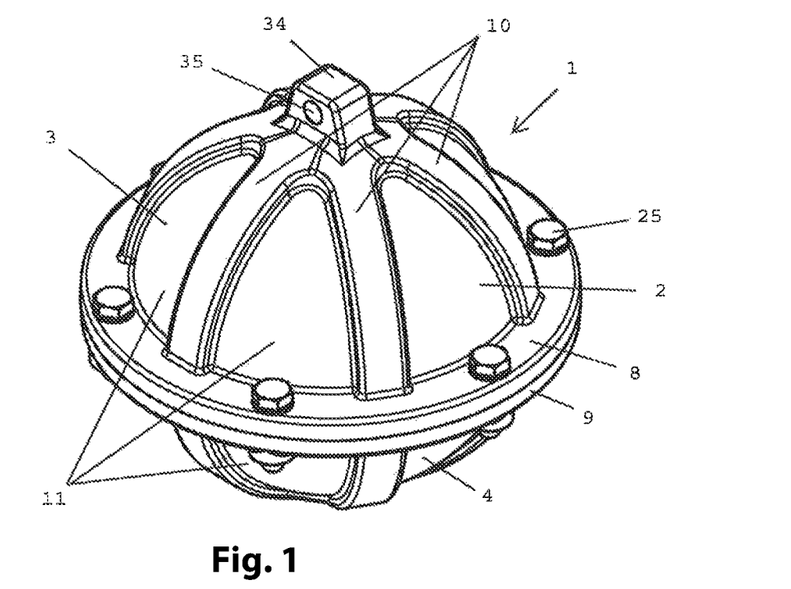
FIG. 1 shows a diagrammatic view of a lamp according to the present disclosure.
Figure 2:
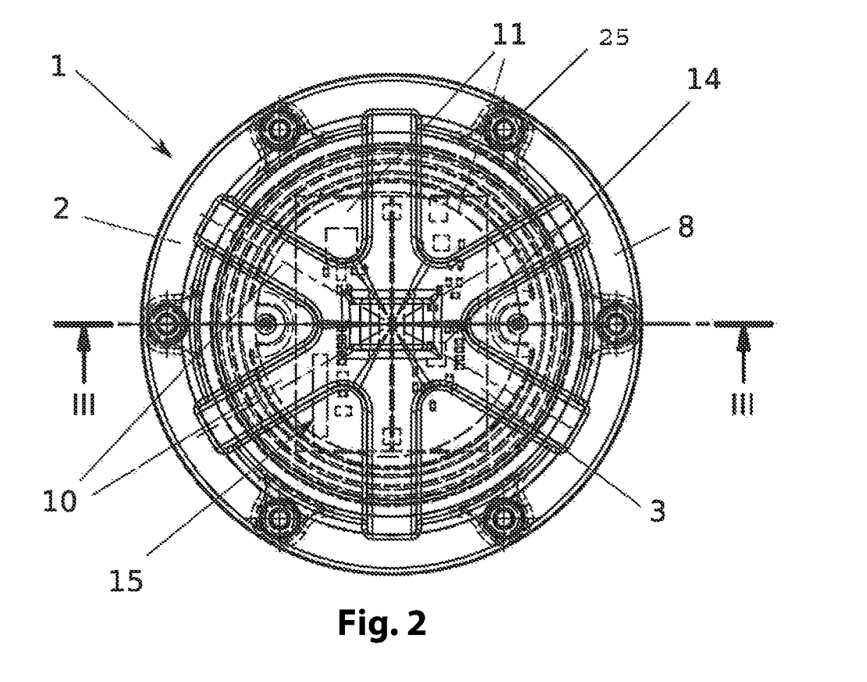
FIG. 2 shows a plan view of the lamp according to FIG. 1.

The basic functions of the lamp 401 correspond to those of the lamp 1 according to the first embodiment as described above in detail.

The lamp 1 according to FIGS. 8-10 may further comprise a wireless transceiver 420 connected with the controller 415. Specifically, the wireless transceiver 420 is a Bluetooth transceiver (e.g. Silicon Laboratories BGM111A256V2 or similar). The controller 415 may be configured to receive settings of the light color and/or a luminosity and/or a flashing interval and/or a sound file via the wireless transceiver 420. The settings may be generated in a dedicated mobile App (e.g. for the Android or iOS platform) and transmitted via Bluetooth to the one or more lamps according to the present disclosure.

The lamp 401 may further comprise a speaker 421 (e.g. PUI Audio AST-03008MR-R or similar). The controller 415 may be configured to control the audio signal emitted by the speaker 421. Specifically, the controller 415 may be configured to control the speaker 421 to play a sound file, which may be received via the wireless transceiver 420 as mentioned above. The lamp 401 may further comprise a video camera 422 and a storage medium formed by a flash storage. The controller 415 may be configured to control the video camera 422 to record images or videos and store them on the flash storage.

The control methods and routines disclosed herein may be stored as executable instructions in non-transitory memory and may be carried out by the control system including the controller in combination with various sensors and other light electrical and hardware components. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may represent code to be programmed into non-transitory memory of the computer readable storage medium in the controller, where the described actions are carried out by executing the instructions in a system including the various light electrical and hardware components in combination with the electronic controller.

The invention claimed is:

1. A lamp for use under water, comprising:
   an electrical lighting means,
   electrical connections for power supply of the electrical lighting means, and
   a housing,
   wherein the housing is translucent at least in sections,
   wherein the housing forms a mechanical shell surrounding the electrical lighting means and the electrical connections, the mechanical shell having a double curvature at each point of the mechanical shell,
   wherein the mechanical shell is composed of two mechanical partial shells,
   wherein the mechanical partial shells are formed by connected housing parts,
   wherein the two housing parts each comprise a connecting flange,
   wherein the connecting flanges are connected with one another,
   wherein at least one of the two housing parts comprises a plurality mechanical struts,
   wherein the plurality of mechanical struts are integrally formed with the at least one of the two housing parts, and
   wherein the plurality of mechanical struts start from the connecting flange of the at least one of the two housing parts and converge in a dome-shaped manner at a vertex of a respective housing part.

2. The lamp according to claim 1, wherein the housing defines a watertightly closable hollow space, wherein the electrical lighting means and the electrical connections are arranged within the hollow space.

3. The lamp according to claim 1, wherein the mechanical shell is substantially spherical.

4. The lamp according to claim 1, wherein the Gaussian curvature of the mechanical shell at each point is at least 1 $m^{-2}$.

5. The lamp according to claim 1, wherein each connecting flange comprises a contact surface, wherein one contact surface comprises a circumferential recess for accommodation of an annular ridge of a contact surface of the other connecting flange.

6. The lamp according to claim 1, wherein the electrical connections connect the electrical lighting means with an accumulator, wherein the accumulator is arranged within the mechanical shell.

7. The lamp according to claim 6, wherein the accumulator is connected with a receiver for a wireless energy transfer, wherein the receiver is arranged within the mechanical shell.

8. The lamp according to claim 2, wherein the electrical lighting means is connected with a light sensor, wherein the light sensor is arranged within the hollow space and is adapted to turn the lighting means off or to control power consumption of the lighting means so that the electrical lighting means is turned off or the power consumption is decreased if the light sensor detects a luminous flux above a predetermined threshold value.

9. The lamp according to claim 2, wherein the electrical lighting means is connected with a magnetic switch or a radio switch, wherein the magnetic switch or the radio switch is arranged within the hollow space and is adapted to receive a control signal via a magnetic field or via radio, wherein the magnetic switch or the radio switch is further adapted to turn the electrical lighting means on or off or to increase or decrease power consumption of the lighting means in dependence on the control signal.

10. The lamp according to claim 1, wherein the housing comprises exterior housing parts and a filling, wherein the filling is arranged between the exterior housing parts and the electrical components inside the mechanical shell.

11. The lamp according to claim 10, wherein the filling comprises a thermoset or an elastomer.

12. The lamp according to claim 1, wherein the housing is a single solid part enclosing inserts formed by the electrical components inside the mechanical shell.

13. The lamp according to claim 1, wherein the electrical lighting means is an electrical multicolor light source.

14. The lamp according to claim 13, wherein the lamp further comprises a controller configured to control a light color emitted by the electrical multicolor light source.

15. The lamp according to claim 13, wherein the electrical multicolor light source emits red and/or green and/or blue light.

16. The lamp according to claim 14, wherein the lamp comprises at least two electrical multicolor light sources, wherein the controller is configured to control the color emitted by each electrical multicolor light source independently.

17. The lamp according to claim 14, wherein the controller is configured to flash the electrical multicolor light source at a predetermined and/or configurable interval.

18. The lamp according to claim 14, wherein the electrical multicolor light source can emit light in the ultraviolet range.

19. The lamp according to claim 1, wherein the lamp further comprises a speaker.

20. The lamp according to claim 14, wherein the lamp further comprises a wireless transceiver connected with the controller.

21. The lamp according to claim 20, wherein the controller is configured to receive settings of the light color and/or a luminosity and/or a flashing interval and/or a sound file via the wireless transceiver.

22. The lamp according to claim 20, wherein the wireless transceiver is a Bluetooth transceiver.

23. The lamp according to claim 1, wherein the lamp comprises a digital camera and a storage medium for storing images and/or videos recorded with the digital camera.

24. The lamp according to claim 1, wherein the lamp is used as a light bait when fishing.

25. The lamp according to claim 24, wherein the lamp is attached to a trap and is submerged together with the trap.

26. A use of a lamp according to claim 1 as a light bait when fishing.

27. The use according to claim 26, wherein the lamp is attached to a trap and is submerged together with the trap.

28. A lamp for use under water, comprising:
 an electrical lighting means,
 electrical connections for power supply of the electrical lighting means, and
 a housing,
 wherein the housing is translucent at least in sections,
 wherein the housing forms a mechanical shell surrounding the electrical lighting means and the electrical connections, the mechanical shell having a double curvature at each point of the mechanical shell,
 wherein the mechanical shell is composed of two mechanical partial shells,
 wherein the mechanical partial shells are formed by connected housing parts,
 wherein the two housing parts each comprise a connecting flange,
 wherein the connecting flanges are connected with one another,
 wherein at least one of the two housing parts comprises a plurality of mechanical struts,
 wherein the plurality of mechanical struts start from the connecting flange of the at least one of the two housing parts and converge in a dome-shaped manner at a vertex of a respective housing part, and
 wherein the at least one of the two housing parts has a smaller wall thickness between adjacent mechanical struts.

* * * * *